United States Patent Office 3,222,956
Patented Dec. 14, 1965

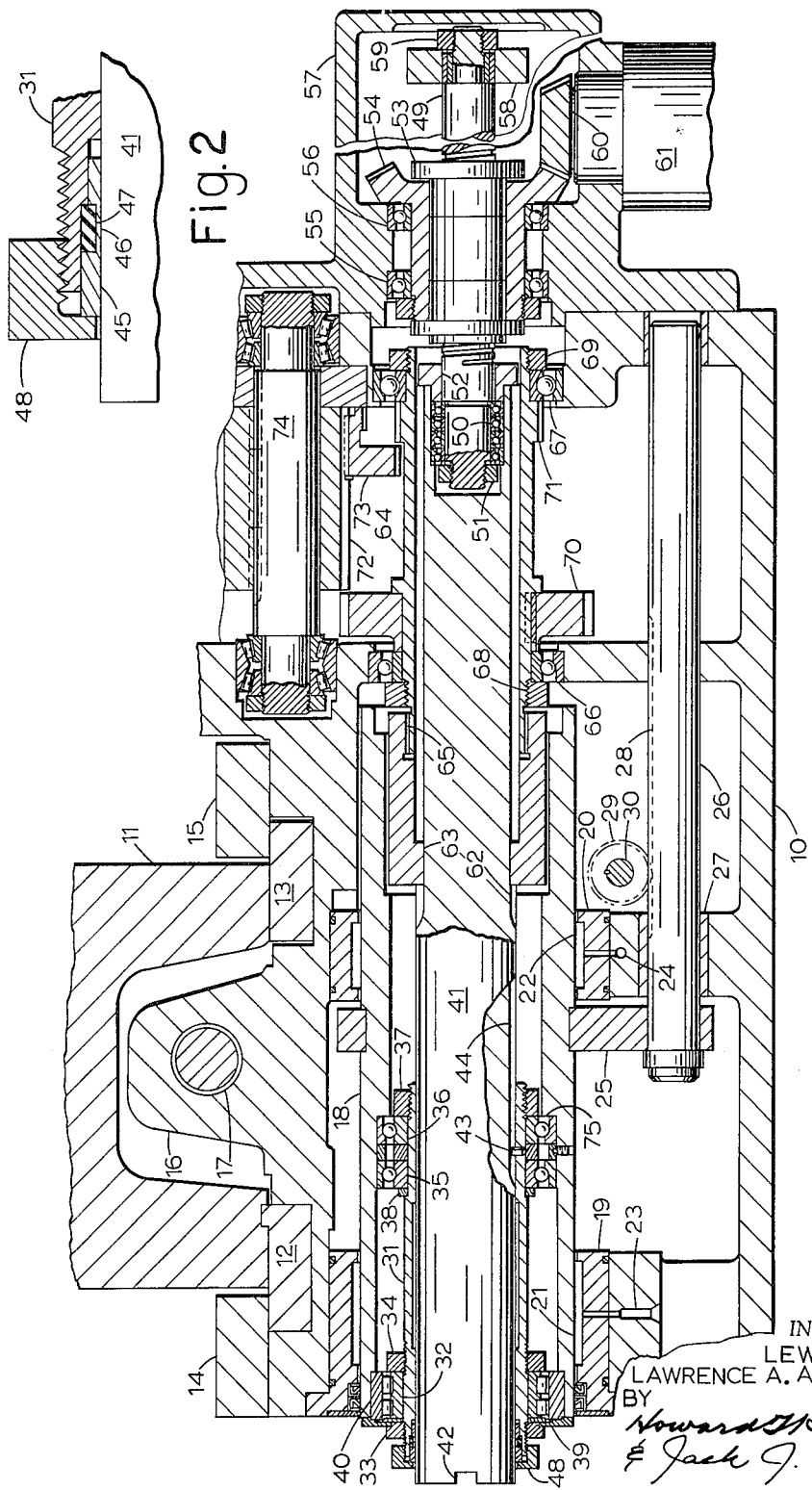

3,222,956
MACHINE TOOL SPINDLE MECHANISM
Lewis A. Dever and Lawrence A. Attermeyer, Cincinnati, Ohio, assignors to The Cincinnati Milling Machine Co., Cincinnati, Ohio, a corporation of Ohio
Filed July 14, 1964, Ser. No. 382,468
8 Claims. (Cl. 77—4)

This invention relates to machine tool spindles and more particularly to a unique boring spindle mechanism.

Boring machine spindles conventionally have a relatively long axial feed stroke for producing long bores and surface contours of considerable depths. It is a common practice to mount the bar type boring spindle in a quill and to provide a feed mechanism for movement of the spindle through the quill. It is also common to provide means for axially adjusting the position of the quill in the spindle carrier so that the spindle can be given additional support against radial deflection when it must be used at a distance out from the carrier. It is, however, the common practice to adjust the quill and then to clamp it in the adjusted position in the spindle carrier after which the boring spindle is moved axially through the quill during a particular cutting operation. In some types of operations this is particularly disadvantageous, for example, in a milling application to produce a deep contour under automatic control such as tracer control or numerical control. The feed stroke of the boring spindle can be rather long and since the radial load bearings are fixed in the quill, the end of the boring spindle holding the cutting tool on which the cutting load is applied is often moved a rather long disttance from the bearings which transmit the radial load between the spindle and quill. This results in excessive and variable radial deflection of the cutter and inaccurate contours and bores.

It is therefore an object of this invention to provide an improved boring machine spindle mechanism in which the radial load bearings directly supporting the boring spindle move with the boring spindle to maintain a constant dimension between them and the cutting tool receiving end of the spindle.

A further object is to provide a boring machine spindle mechanism in which the spindle is adjustable relative to the quill but in which the quill moves axially with this spindle during a cutting operation.

Yet another object is to provide a more rigid spindle mechanism under cutting conditions with less variation in cutter deflection.

Still another object of this invention is the provision of an easily moved quill in a boring spindle mechanism whereby the spindle and quill can be moved axially in unison without adding appreciable friction forces to the load on the axial feed mechanism and wherein the quill is rigidly supported in the spindle carrier.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention utilizes a quill that is received through the spindle carrier for axial movement in anti-friction bearing means such as hydrostatic journals. Bearings are carried in the quill to support a boring spindle for rotation and to absorb the radial load therefrom. A releasable clamp mechanism is provided to hold the boring spindle in a selected axial position relative to these bearings so that when the spindle is moved axially by a transmission mechanism connected directly thereto, the quill is also carried along. A rotary drive transmission is also connected directly to the boring spindle to rotate it in the quill. A clear understanding of the construction and operation of the mechanism can be obtained from the following detailed description in which reference is made to the attached drawings wherein:

FIG. 1 is a longitudinal section view of a boring machine spindle carrier and spindle mechanism on a horizontal plane.

FIG. 2 is an enlarged view of a small portion of the section of FIG. 1.

FIG. 1 shows a spindle carrier unit 10 attached to a column 11 for movement along a pair of vertical ways 12 and 13 that are attached securely to the side of the column 11. The spindle carrier 10 is held on the ways 12 and 13 by a pair of retaining strips 14 and 15 which are permanently attached to the back side of the spindle carrier 10 and overlap the back of the ways 12 and 13. A yoke portion 16 of the spindle carrier 10 extends into the column 11 where it is engaged over a screw 17 which is journalled for rotation in the column 11. The yoke 16 and screw 17 provide the means by which the spindle carrier 10 is moved vertically on the ways 12 and 13 and the screw 17 is rotated in the column 11 by a conventional power means, not shown, which can be one of several types well known in the art to provide this vertical movement.

A cylindrical quill 18 is received in the carrier 10 and extends partly therethrough. The quill 18 is supported in a pair of anti-friction journal members 19 and 20 which are attached inside of the spindle carrier 10. The journal members 19 and 20 are each hydrostatic bearing members in which an annular cavity 21 and 22, respectively, is provided to which cavities fluid under pressure is connected through lines 23 and 24 extending through the spindle carrier 10. When fluid under pressure is connected to the cavities 21 and 22 which extend around the quill 18, the quill 18 is supported for free movement in the spindle carrier 10 in the axial direction. Since the quill 18 is to move only in the axial direction, a yoke 25 is fixed on the quill 18 and a rod 26 is provided having its forward end attached to the yoke 25. The rod 26 is slidably received through a bushing 27 that is fixed in the carrier 10. Since the rod 26 is radially displaced from the quill 18 and is attached thereto by the yoke 25 and is slidable through the fixed bushing 27, the quill is prevented from rotating by the rod 26 and bushing 27. Axial positioning of the quill 18 in the spindle carrier 10 can be accomplished manually by rotation of a pinion 29 that is engaged with a rack 28 formed on the side of the rod 26. The pinion 29 is keyed to a shaft 30 that is rotatable in the carrier 10 and extends from the side thereof for the machine operator's access to rotate it.

A sleeve 31 is inserted into the quill 18 and is held for rotation at a position spaced therefrom. The forward end of the sleeve 31 has an anti-friction roller type bearing 32 attached thereto and held in place by nuts 33 and 34. The rearward portion of the sleeve 31 has a pair of ball bearings 35 and 36 held in position thereon by a nut 37 and a spacer member 38. The outer races of the bearings 32, 35 and 36 are received directly against the interior of the quill 18. Thus the sleeve 31 is freely rotatable inside the quill 18. The outer race of the bearing 36 is received directly against a shoulder 75 inside the quill 18 and the outer race of the bearing 32 is received in a counter-bore 40 in the quill 18 and held firmly therein by a retaining ring 39. Therefore the sleeve 31 is maintained at a fixed axial position inside the quill 18. A bar type boring spindle 41 is received through the sleeve 31 and is axially adjustable therethrough. The forward end 42 of the spindle 41 is adapted to hold a cutting tool, not shown, during a cutting operation. The spindle 41 and the sleeve 31 are rotatable in unison since a pin 43 extends radially inward from the sleeve 31 to engage in a longitudinal slot 34 that extends along the side of the quill 41. The sleeve 31 and spindle 41 can be clamped together to prevent relative axial movement therebetween. For this purpose a bushing 45, FIG. 2, having a stepped outside diameter is received in a stepped bore in the sleeve 31. The bushing 45 has an annular thin section 46 which extends around and in contact with the spindle 41. A space behind the thin walled section 46 is filled with an incompressible substance that is flowable under pressure. Substances such as a soft polyvinyl chloride resin which is flowable under pressure is especially suitable for this purpose since it reacts in accordance with hydraulic principles but does not leak out from the spaces. When the pressure of the fluid in the space 47 is increased the thin section 46 tends to bulge outward and grip the spindle 41. To compress the substance in the space 47, a nut 48 is threaded onto the forward end of the sleeve 31 and bears against the forward end of the bushing 45. When the nut 48 is turned on to the sleeve 31 the bushing 45 is moved into the sleeve 31 and this reduces the space 47 to compress the substance therein. This places the substance therein under high pressure and causes the thin section 46 to grip the spindle 41 and hold it firmly against axial movement in the sleeve 31. When the nut 48 is moved off of the sleeve 31, the pressure is removed from the substance in the space 47 and the spindle 41 can then be easily moved axially in the sleeve 31 to an adjusted position. From the foregoing description it can be seen that the spindle 41 is rotatable inside the quill 18 and is axially adjustable therein after which it can be clamped in an adjusted position.

An axial feed mechanism is connected directly to the spindle 41 and controls its axial position during a cutting operation. The axial feed mechanism includes a feed screw 49 that is connected directly to the rear end of the spindle 41. The screw 49 is rotatably received in the spindle 41 by a set of bearings 50 adapted to transmit axial thrust forces between the spindle 41 and the screw 49. The bearings 50 are fixed on the end of the screw 49 inside the rearward end of the spindle 41. The bearings 50 are retained on the screw 49 by a nut 51 and the bearings 50 are held inside the spindle 41 by a bushing 52 loosely received around the screw 49 and fixed in the spindle 41 for receipt against the bearings 50. Therefore the screw 49 is axially movable with the spindle 41 but the spindle is rotatable with respect to the screw 49. In the embodiment shown the screw 49 is a conventional ball bearing type feed screw and a recirculating ball bearing nut 53 is received thereover and is rotatable with respect to the feed screw 49. A gear member 54 is fixed around the nut 53 and a set of bearings 55 and 56 support the gear 54 in a motor housing 57 for rotation relative thereto. The housing 57 is fixed to the spindle carrier 10. The gear 54 and nut 53 are rotatably driven relative to the feed screw 49 to produce axial feed movement of the screw 49 and spindle 41. To prevent rotation of the feed screw 49 a yoke 58 is fixed on the rear end of that screw and is slidably received against the housing 57 in a track, not shown, to prevent rotation of the yoke 58 and screw 49. The yoke 58 is maintained on the end of the feed screw 49 by a nut 59 threaded onto the rear of the screw 49. Rotation of the gear 54 is accomplished by the rotation of a gear 60 in mesh therewith. The gear 60 is attached to a shaft extending from a feed motor 61 which provides the feed power to axially move the screw 49.

The rotational drive is also applied directly to the spindle 41. For this purpose, the rear portion of the spindle 41 is splined as at 62 and this splined section 62 is engaged by a mating drive member 63. The drive member 63 is engaged by a member 64 at a toothed engagement 65. The member 64, the shape of a sleeve, has a set of bearings 66 at one end and a second set of bearings 67 at the other end to support the sleeve 64 for rotation in the carrier 10. The bearings 66 and 67 are retained on the sleeve 64 by a pair of nuts 68 and 69, respectively. A low speed gear 70 is fixed on the sleeve 64 at one location and a high speed gear 71 is formed thereon at a location spaced from the gear 70. The gear 70 is engageable by a drive gear 72 for rotation at a slow speed. A gear 73 is engaged over the gear 72 and is adapted to engage the gear 71 to drive the sleeve 64 at a higher speed. The gear 72 is fixed on a shaft for rotation therewith but is axially movable along the shaft 74 one way and the other to engage the gear 72 with the gear 70 or the gear 73 with the gear 71. Movement of the gear 72 along shaft 74 is provided by a shifter mechanism of conventional type and is not shown in this disclosure since it forms no part of the present invention. The gear 72 is rotated by additional gears in a multispeed transmission extending from the gear 72 to a spindle motor, also not shown in the present disclosure. This transmission and motor are of conventional nature and connection and need not be described in further detail.

From the foregoing description it can be seen that when pressure is applied to the flowable substance in the space 47 by turning the nut 48 onto the sleeve 31, the spindle 41 is caused to be clamped in position and axially fixed with respect to the sleeve 31. It can also be seen that when the spindle 41 is powered for rotation by the described mechanism that the sleeve 31 will be positively rotated by the pin 43 extending into the slot 44 and fixed in the sleeve 31 as well as by the described spindle clamping mechanism. Therefore the sleeve 31 moves axially with the spindle 41 and also rotates therewith. Since the sleeve 31 is rotatably supported in the quill 18 and the quill 18 is prevented from rotating, the sleeve 31 will rotate with respect to the quill 18 but the sleeve 31 will exert a pull on the quill 18 to move it axially upon axial movement of the spindle 41. Since the quill 18 is supported for free axial movement by the hydrostatic bearings 19, 20, the quill 18 will also follow the axial movement of the spindle 41. Therefore as the spindle 41 is moved outward from the carrier 10, that is toward the left as viewed in FIG. 1, the support bearings 32, 35 and 36 will also be moved outward with the quill 18. These bearings will be maintained in a constant axial position with respect to the spindle 41. Since these bearings provide the means for transmission of the radial load forces from the spindle 41 during cutting and since they will move outward with the spindle 41, the spindle 41 will be held in a more rigid condition than would be possible otherwise in having the spindle 41 to move outward with respect to the quill 18 and the bearings 32, 35 and 36. The bearings 32, 35 and 36 are not intended to have appreciable axial loading on them since the bearings 50 at the feed screw 49 are angular contact bearings adapted to receive the thrust from the cutting operation and to transmit it to the feed screw 49. The only axial loading on the bearings 32, 35 and 36 will be that imposed by the drag of the quill 18 at the bearings 19 and 20 and the additional axial load on the quill 18 due to the drag of the rod 26, but this is very little and the total axial drag transmitted through the bearings 32, 35 and 36 is very low. Therefore the spindle 41 is moved very easily in the axial direction by the feed screw 49 and nut 53 except for the actual cutting load. A change in the relative axial position of the spindle 41 in the quill 18 can be made easily by withdrawing the nut 48 partially from the sleeve 31 to reduce the pressure in the cavity 47 to thereby release the quill 41 from the sleeve 31. After selective positioning of the spindle 41 in the sleeve 31 and quill 18, the nut 48 is moved back onto the sleeve 31 to secure the spindle 41 in the adjusted position.

While the invention has been described in connection with one possible form or embodiment thereof it is to be understood that the present disclosure is illustrative rather than restrictive and that changes and modifications may be made without departing from the spirit of the invention or the scope of the claims which follow.

What is claimed is:

1. A boring machine spindle carrier having a spindle mechanism therein comprising:
   (a) a quill,
   (b) anti-friction means for supporting said quill in the carrier to permit free axial movement thereof,
   (c) means for confining said quill to axial movement only,
   (d) a boring spindle received through said quill,
   (e) means coupled directly to said boring spindle for axial movement thereof,
   (f) means for rotatably supporting said boring spindle in a selected axial position in said quill and including releasable means for axially fixing said boring spindle in said quill, and
   (g) means for rotatably driving said boring spindle in said quill.

2. A boring machine spindle carrier having a spindle mechanism therein comprising:
   (a) a quill,
   (b) anti-friction means for supporting said quill in the carrier to permit free axial movement thereof,
   (c) means for confining said quill to axial movement only,
   (d) a boring spindle received through said quill,
   (e) means coupled directly to said boring spindle for axial movement thereof,
   (f) means for rotatably supporting said boring spindle in a selected axial position in said quill and including anti-friction bearings for transmitting radial forces from said boring spindle to said quill and releasable means for axially fixing said boring spindle in said quil, and
   (g) means for rotatably driving said boring spindle in said quill.

3. A boring machine spindle carrier having a spindle mechanism therein comprising:
   (a) a quill received through the carrier for axial movement only,
   (b) anti-friction means for supporting said quill in the carrier for free movement therethrough,
   (c) a boring spindle received through said quill,
   (d) means coupled directly to said boring spindle for absorbing axial forces therefrom and for axial movement thereof,
   (e) means for rotatably supporting said boring spindle in said quill and including anti-friction bearings for transmitting radial forces from said boring spindle to said quill and releasable means for axially fixing said boring spindle in a selected axial location in said quill, and
   (f) means for rotating said boring spindle in said quill while said quill and boring spindle move axially in unison.

4. A boring machine spindle carrier having a spindle mechanism therein comprising:
   (a) a quill received through the carrier for axial movement only,
   (b) anti-friction means for supporting said quill in the carrier for free axial movement therethrough,
   (c) a boring spindle received through said quill,
   (d) means coupled directly to said boring spindle for reversible axial movement thereof and including anti-friction bearings for transmitting axial thrust therebetween,
   (e) means for rotatably supporting said boring spindle in said quill and including anti-friction bearings for transmitting radial forces to said quill and releasable means for securing said boring spindle to said quill for axial movement together, and
   (f) means for rotating said boring spindle in said quill.

5. A boring machine spindle carrier having a spindle mechanism therein comprising:
   (a) a quill,
   (b) anti-friction bearings in the carrier and around said quill to permit free movement thereof,
   (c) means for confining said quill to axial movement only,
   (d) a sleeve,
   (e) anti-friction means for rotatably supporting said sleeve at a fixed axial position in said quill,
   (f) a cylindrical boring spindle received through said sleeve for rotation therewith and axial adjustment relative thereto,
   (g) means for directly coupling a rotary drive to said boring spindle for rotation thereof with said sleeve,
   (h) means connected directly to said boring spindle for axial movement thereof, and
   (i) releasable means for clamping said boring spindle in a selected axial position in said sleeve to cause said sleeve and quill to follow axial movement of said boring spindle.

6. A boring machine spindle carrier having a spindle mechanism therein comprising:
   (a) a quill,
   (b) anti-friction bearings in the carrier and around said quill to permit free movement thereof,
   (c) means for confining said quill to axial movement only,
   (d) a sleeve,
   (e) anti-friction means for rotatably supporting said sleeve at a fixed axial position in said quill,
   (f) a cylindrical boring spindle received through said sleeve for rotation therewith and axial adjustment relative thereto,
   (g) means for directly coupling a rotary drive to said boring spindle for rotation thereof with said sleeve,
   (h) transmission means connected directly to said boring spindle for axial movement thereof,
   (i) a reversibly operable feed motor connected to said transmission means for driving said boring spindle axially in one and the other directions, and
   (j) releasable means for clamping said boring spindle in a selected axial position in said sleeve to cause said sleeve and quill to follow axial movement of said boring spindle.

7. A boring machine spindle carrier having a spindle mechanism therein comprising:
   (a) a quill,
   (b) hydrostatic bearings in the carrier and around the quill to permit free movement thereof,
   (c) means for confining said quill to axial movement only,
   (d) a sleeve,
   (e) anti-friction means for rotatably supporting said sleeve at a fixed axial position in said quill,
   (f) a cylindrical boring spindle received through said sleeve for rotation therewith and axial adjustment relative thereto,
   (g) means for directly coupling a rotary drive to said boring spindle for rotation thereof with said sleeve,
   (h) an axially movable feed screw in axial alignment with said boring spindle,
   (i) means for securing said boring spindle to said feed screw for axial movement therewith and rotation relative thereto,
   (j) a nut axially fixed in said carried and engaged over said feed screw,
   (k) means for selectively producing relative rotation between said nut and feed screw to shift said feed screw and boring spindle axially, and (l) releasable means for clamping said boring spindle in a selected axial position in said sleeve to cause said sleeve and quill to follow axial movement of said boring spindle.

8. A boring machine spindle carrier having a spindle mechanism therein comprising:
   (a) a quill,
   (b) hydrostatic bearings in the carrier and around the quill to permit free movement thereof,
   (c) means for confining said quill to axial movement only,
   (d) a sleeve,
   (e) anti-friction means for rotatably supporting said sleeve at a fixed axial location in said quill,
   (f) a cylindrical boring spindle received through said sleeve for rotation therewith and axial adjustment relative thereto,
   (g) means for directly coupling a rotary drive to said boring spindle for rotation thereof with said sleeve,
   (h) means connected directly to said boring spindle for axial movement thereof,
   (i) a bushing in said sleeve having a thin annular section therearound in contact with said boring spindle and a cavity therebehind filled with a pressure flowable substance of very low volumetric compressibility, and
   (j) means to pressurize the flowable substance in said cavity to tend to bulge said thin annular section against said boring spindle and clamp said boring spindle in a selected axial position in said sleeve to cause said sleeve and quill to follow axial movement of said boring spindle.

No references cited.

WILLIAM W. DYER, JR., *Primary Examiner.*